(12) United States Patent
Ohmura et al.

(10) Patent No.: US 12,424,899 B2
(45) Date of Patent: Sep. 23, 2025

(54) MOTOR AND CONNECTION STRUCTURE OF MOTOR AND SUBSTRATE

(71) Applicant: MINEBEA MITSUMI Inc., Nagano (JP)

(72) Inventors: Jun Ohmura, Kitasaku-gun (JP); Koichiro Hirabayashi, Kitasaku-gun (JP); Yukimasa Matsumura, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 268 days.

(21) Appl. No.: 18/186,245

(22) Filed: Mar. 20, 2023

(65) Prior Publication Data

US 2023/0327513 A1 Oct. 12, 2023

(30) Foreign Application Priority Data

Mar. 24, 2022 (JP) .................. 2022-048702

(51) Int. Cl.
*H02K 5/22* (2006.01)
*H01R 39/39* (2006.01)
*H02K 5/14* (2006.01)

(52) U.S. Cl.
CPC ............. *H02K 5/225* (2013.01); *H01R 39/39* (2013.01); *H02K 5/148* (2013.01); *H02K 5/22* (2013.01)

(58) Field of Classification Search
CPC ........ H01R 39/39; H02K 5/145; H02K 5/225; H02K 5/148; H02K 5/22; H02K 11/30; H02K 11/33
USPC .................................................. 310/71, 68 R
See application file for complete search history.

(56) References Cited

U.S. PATENT DOCUMENTS

| 2002/0050759 | A1* | 5/2002 | Shiraki .................. H02K 5/145 310/239 |
| 2008/0291650 | A1  | 11/2008 | Hautvast et al. |
| 2017/0302131 | A1* | 10/2017 | Kuroda .................... H02K 7/08 |
| 2022/0255405 | A1* | 8/2022 | Saito .................... H01R 39/383 |

FOREIGN PATENT DOCUMENTS

| JP | 2007-535805 A | 12/2007 |
| JP | 2019-022331 A | 2/2019 |

* cited by examiner

*Primary Examiner* — Alexander A Singh
(74) *Attorney, Agent, or Firm* — Chrisman Gallo Tochtrop LLC (57) ABSTRACT

A motor includes: a lid including an opening; a bracket including a projecting part; and a terminal extending from the projecting part. A part of the bracket is covered by the lid. The projecting part projects from the opening of the lid.

5 Claims, 9 Drawing Sheets

MOTOR AND CONNECTION STRUCTURE OF MOTOR AND SUBSTRATE

CROSS-REFERENCE TO RELATED APPLICATIONS

This application claims benefit of priority to Japanese Patent Application No. JP2022-048702 filed on Mar. 24, 2022. The entire contents of the above-identified application are hereby incorporated by reference.

TECHNICAL FIELD

The present invention relates to a motor and a connection structure of a motor and a substrate.

BACKGROUND ART

A known technique for brushed motors and the like includes, when connecting a motor to a sensor or the like, causing a terminal of the motor to project out in a rotary shaft direction and connecting the terminal to a substrate such as a flexible substrate or the like.

CITATION LIST

Patent Literature

Patent Document 1: JP 2019-22331 A
Patent Document 2: JP 2007-535805 A

SUMMARY OF INVENTION

Technical Problem

When a substrate such as a flexible substrate or the like is fixed to a terminal of a motor, the vibrations and the like of the motor are transferred. This may cause instability in the connection between the substrate and the terminal.

In one aspect, an object is to provide a motor with a stable connection between a terminal and a substrate and a connection structure of a motor and a substrate.

Solution to Problem

In one aspect, a motor includes: a lid including an opening; a bracket including a projecting part; and a terminal extending from the projecting part. A part of the bracket is covered by the lid. The projecting part projects from the opening of the lid.

According to one aspect, the connection between the terminal and the substrate can be made stable.

DESCRIPTION OF EMBODIMENTS

An embodiment of a motor and a connection structure of a motor and a substrate disclosed in this application is described below with reference to the drawings. Note that in the drawings, the dimensional relationship of elements and the ratio of the elements may differ from reality. Among the drawings, parts having mutually different dimensional relationships and proportions may be included.

EMBODIMENTS

Figure 1:
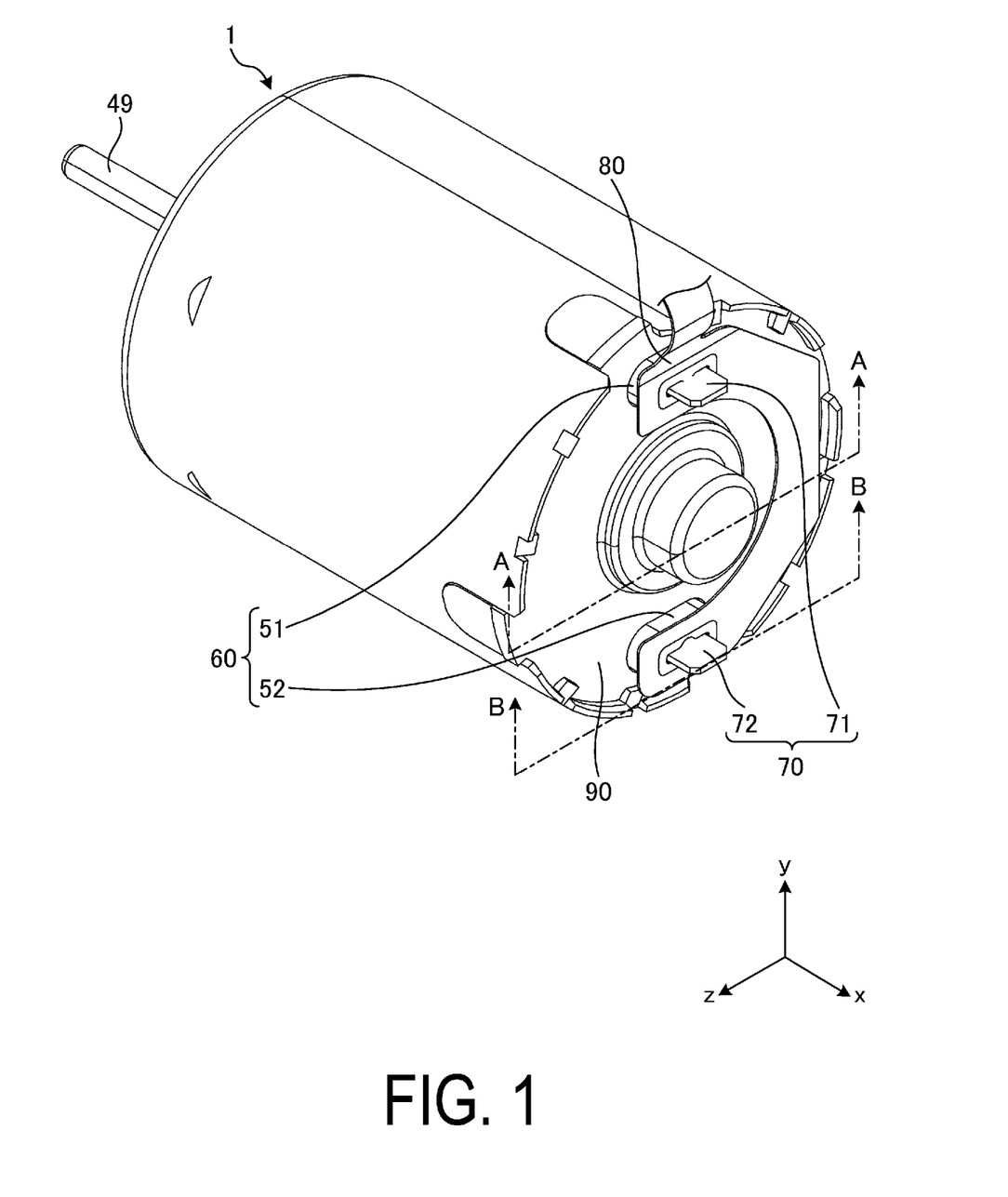
FIG. 1 is a perspective view illustrating an example of a motor connected to a substrate according to an embodiment.
Figure 2:
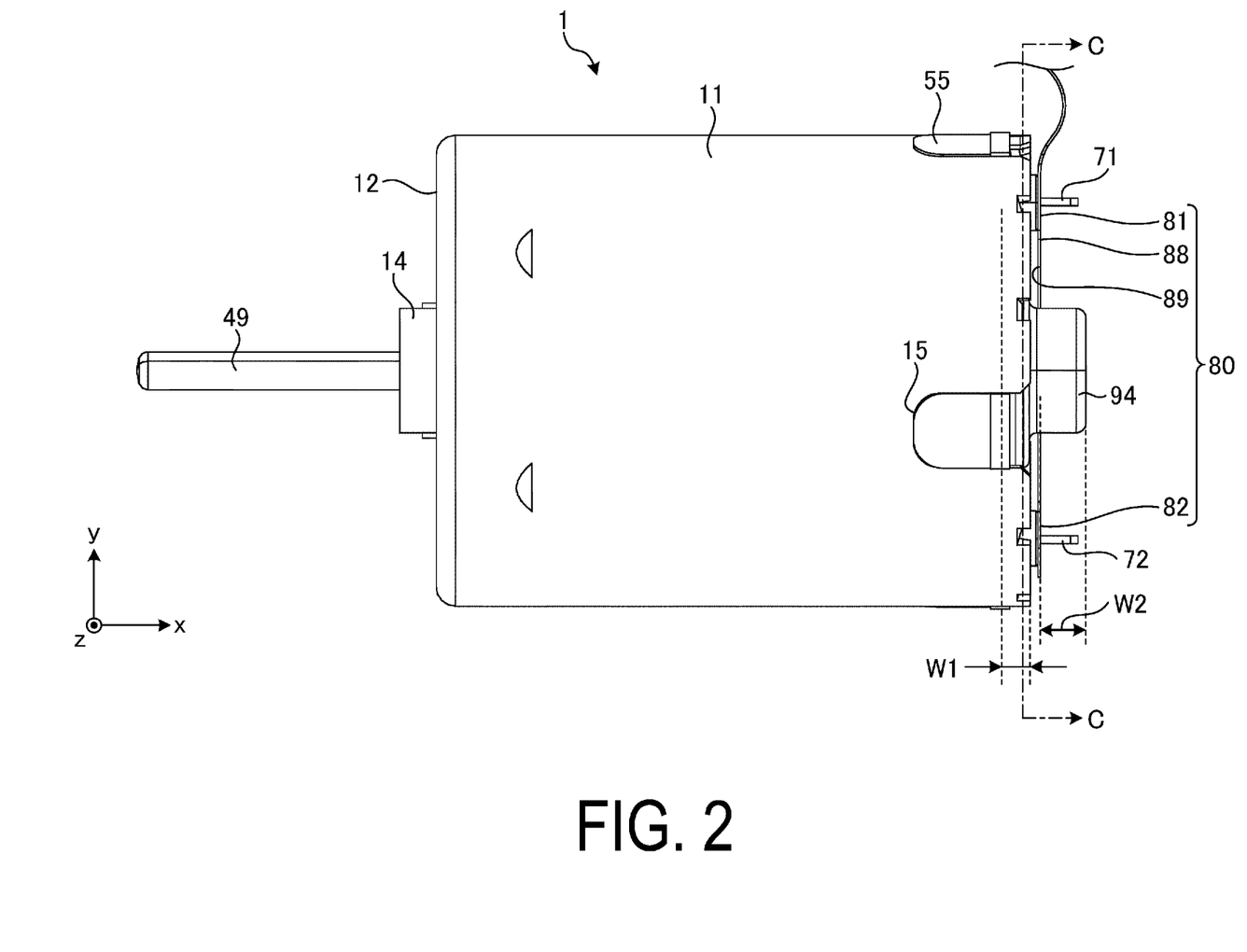
FIG. 2 is a side view illustrating an example of a motor connected to a substrate according to an embodiment.
Figure 3:
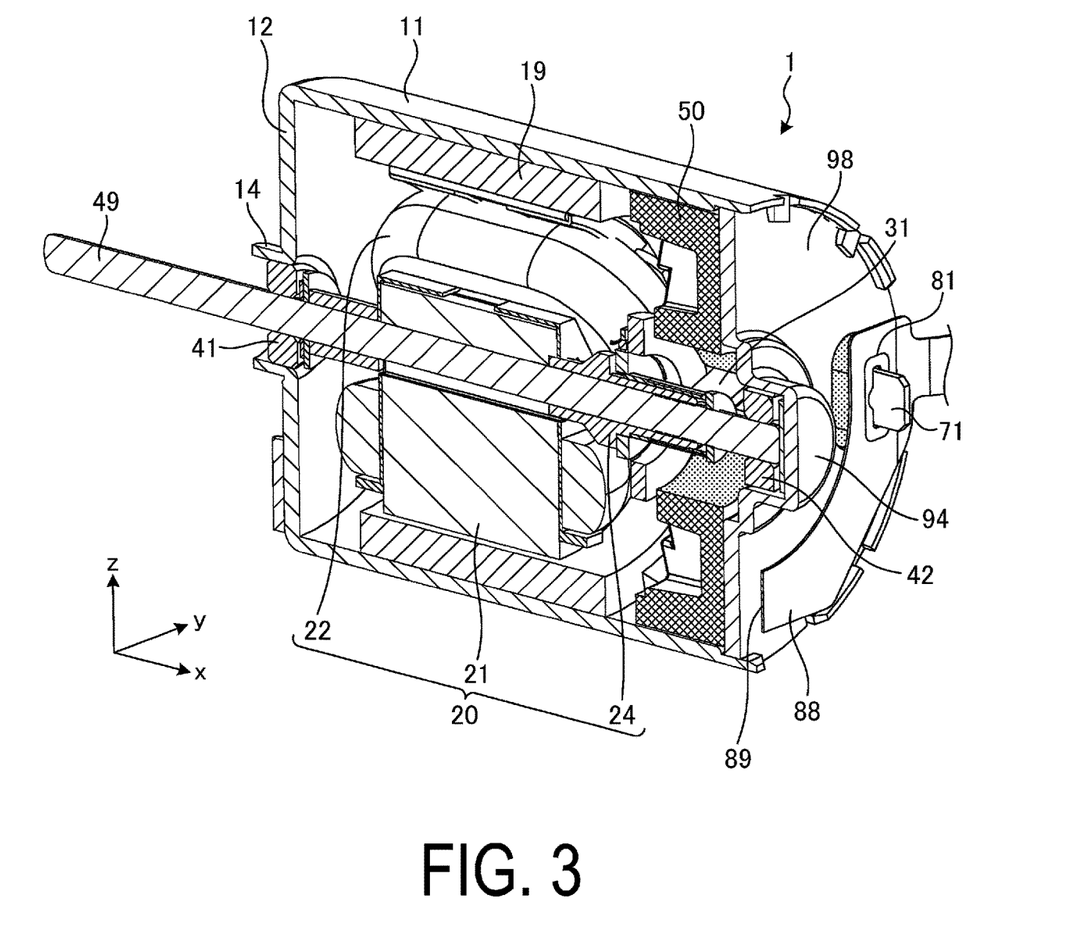
FIG. 3 is a cross-sectional view illustrating an example of a motor connected to a substrate according to an embodiment.
Figure 4:
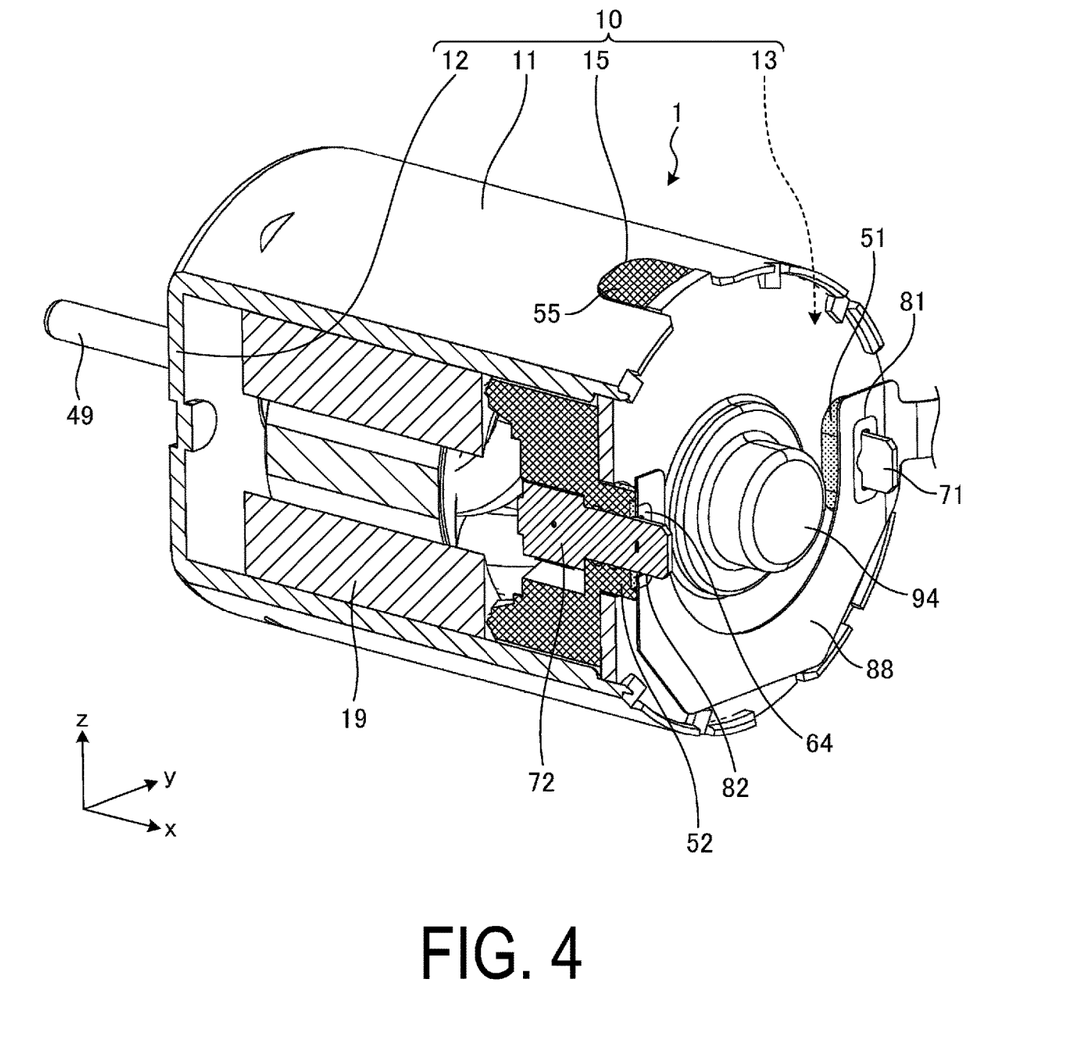
FIG. 4 is another side cross-sectional view illustrating an example of a motor connected to a substrate according to an embodiment.

First, a motor according to the present embodiment will be described with reference to FIG. 1. FIG. 1 is a perspective view illustrating an example of a motor connected to a substrate according to an embodiment. FIG. 2 is a side view illustrating an example of a motor connected to a substrate according to an embodiment. FIG. 3 is a side cross-sectional view illustrating an example of a motor connected to a substrate. FIG. 4 is another side cross-sectional view illustrating an example of a motor connected to a substrate according to an embodiment. FIG. 3 illustrates a cross section taken along line A-A in FIG. 1. FIG. 4 illustrates a cross section taken along line B-B in FIG. 1. Note that in the drawings, only a part of a substrate 80 including holes 81 and 82 corresponding to a connection part with terminals 71 and 72 of a motor 1 is illustrated. Also, for the sake of clarity, a Cartesian coordinate system with an extension direction of a shaft 49 defined as an X-axis direction is used in the drawings. Note that hereinafter, when the terminals 71 and 72 are not distinguished from each other, they may be referred to as terminals 70 in some cases. Also, in the drawings, a solder S connecting the substrate 80 and the terminals 70 may be omitted.

In the embodiment, the motor 1 is a three-phase DC brushed motor, for example. The motor 1 includes a frame 10, an armature 20, a bracket 50, a lid 90, and the terminals 70. Also, the motor 1 further includes bearings 41 and 42 and the shaft 49.

The frame 10 includes a tubular part 11, a bottom part 12, and an opening 13. In the embodiment, relative to the tubular part 11, the bottom part 12 is located at the negative X-axis direction side of the tubular part 11, and the opening 13 is located at the positive X-axis direction side of the tubular part 11. The tubular part 11 has a cylindrical shape with a substantially circular cross-sectional shape, for example. A projecting part 14 projecting to the negative X-axis direction side is also formed at the bottom part 12. In the opening 13, a plurality of indents 15 are formed at a part that meets the tubular part 11. The opening 13 is supported by the lid 90 from the positive X-axis direction side. Furthermore, a plurality of magnets 19 are disposed in the circumferential direction at the inner peripheral surface side of the tubular part 11.

The armature 20 opposes the magnets 19 in the radial direction and rotates with the shaft 49 as the rotary shaft. The armature 20 includes a rotor core 21, a coil 22, a commutator 24, and a plurality of brushes 31 and 32 that come into contact with the commutator 24. The rotor core 21 is formed by stacking electromagnetic steel plates (magnetic bodies) such as silicon steel plates in the X-axis direction, for example. The coil 22 is formed by winding a conducting wire such as a rectangular wire made of copper around the rotor core 21 via an insulator (not illustrated). The commutator 24 energizes the coil 22 by coming into contact with the brushes 31 and 32 installed at the bracket 50.

The shaft 49 is rotatably supported by the bearings 41 and 42. Specifically, the shaft 49 is indirectly supported by the projecting part 14 of the frame 10 via the bearing 41. One end part of the shaft 49 projects to the negative X-axis direction side from the projecting part 14 of the frame 10. The other end part of the shaft 49 is indirectly supported by the lid 90 via the bearing 42. The shaft 49 moves together with the armature 20 and transfers a driving force to an external device.

In FIG. 1, a connection structure of a motor and a substrate including the electrically connected substrate 80 and the terminals 71 and 72 of the motor 1 is illustrated. The substrate 80 is a flexible substrate, for example, and includes a first surface 89 opposing the lid 90 of the motor 1 in the X-axis direction and a second surface 88 on the opposite side to the first surface 89. The lid 90 includes a surface 98 opposing the substrate 80. The substrate 80 is supported by projecting parts 51 and 52 of the bracket 50 described below. The first surface 89 of the substrate 80 is separated from the surface 98 of the lid 90. The substrate 80 is connected to the terminals 71 and 72. Specifically, the holes 81 and 82 for accepting terminals 71 and 72 respectively are formed at the substrate 80. At the second surface 88, the part surrounding the hole 81 is electrically connected to the terminal 71, and the part surrounding the hole 82 is electrically connected to the terminal 72. Accordingly, the substrate 80 is electrically connected to the motor 1 via the terminals 70.

The substrate 80 is connected to a rotation angle detection sensor (not illustrated), for example. The rotation angle detection sensor detects the rotation angle of a gear rotating in cooperation with the shaft 49 to control the rotation angle of the gear, for example.

Figure 5:
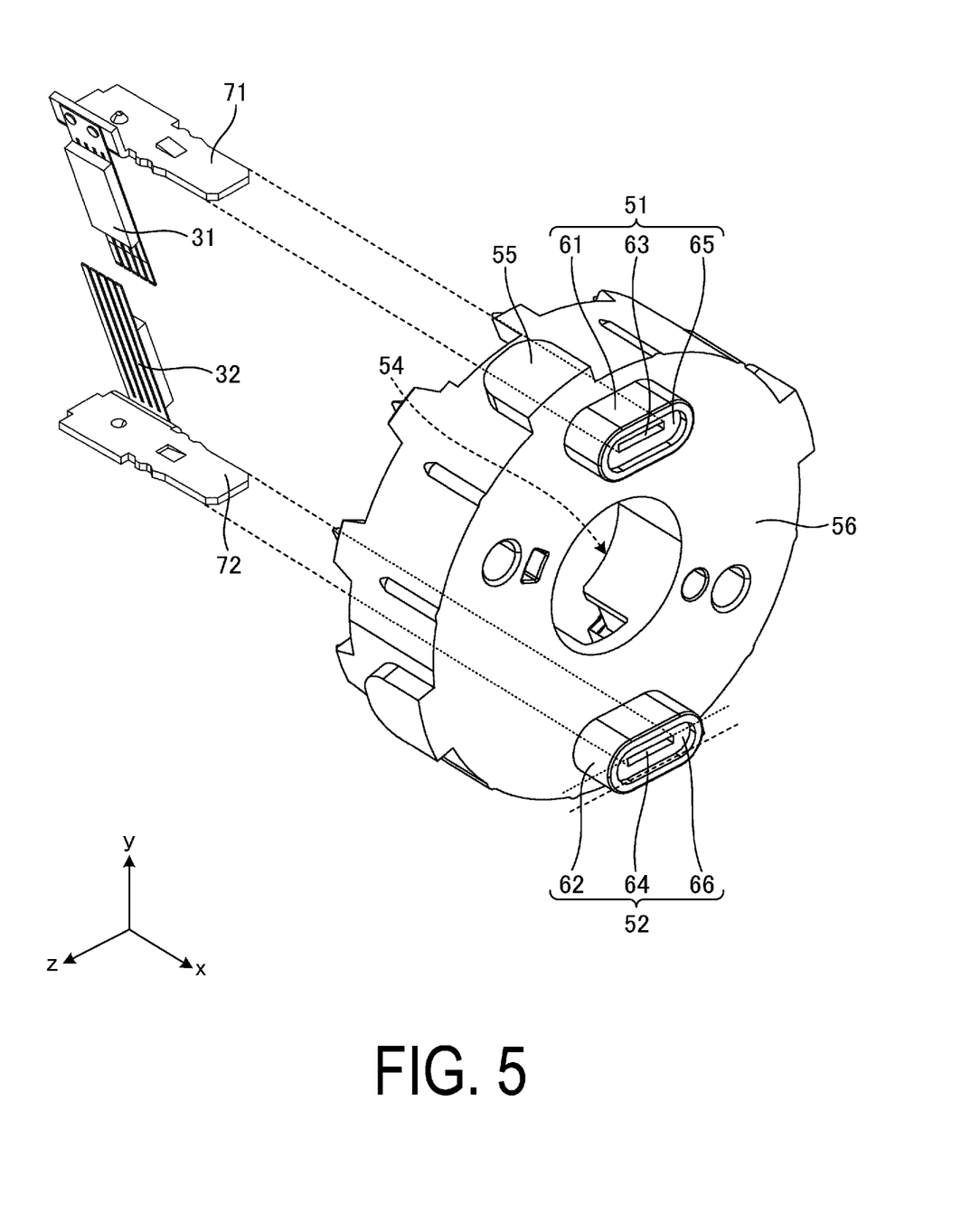
FIG. 5 is an exploded perspective view illustrating an example of how a bracket and terminals are joined in an embodiment.

The bracket 50 holds the brushes 31 and 32 and the terminals 71 and 72. Also, the bracket 50 holds a spring (not illustrated) that urges the brushes 31 and 32 against the commutator 24. In the embodiment, as illustrated in FIG. 5, the brush 31 is connected to the terminal 71 and held by the bracket 50, and the brush 32 is connected to the terminal 72 and held by the bracket 50. FIG. 5 is an exploded perspective view illustrating an example of how the bracket and the terminals are joined in the embodiment. As illustrated in FIG. 5, the bracket 50 includes the two projecting parts 51 and 52, an opening 54, a surface 56, and a plurality of engagement parts 55. Note that hereinafter, the two projecting parts 51 and 52 may be referred to without distinction as projecting parts 60.

The projecting parts 60 project in the positive X-axis direction side past the surface 56. The shaft 49 is inserted into the opening 54. The surface 56 is a part excluding the projecting parts 60 and is formed in a substantially planar shape extending in a direction intersecting the X-axis direction, for example. The plurality of engagement parts 55 project outward in the radial direction from the surface 56, for example. As illustrated in FIG. 4, the plurality of engagement parts 55 engage with the recessed parts (hereinafter, referred to as indents) 15 of the frame 10. Note that the surface 56 is an example of a part of the bracket covered by the lid.

The projecting parts 51 and 52 include hole parts 63 and 64 for accepting the terminals 71 and 72 and wall parts 61 and 62 surrounding the terminals 71 and 72, respectively. The wall parts 61 and 62 are formed in a substantially elliptical shape, for example, and support the substrate 80 from the negative X-axis direction side. The hole parts 63 and 64 extend in the X-axis direction. The terminals 71 and 72 connected to the brushes 31 and 32, respectively, are inserted into the hole parts 63 and 64, respectively, in a direction from the bracket 50 toward the substrate 80 described below. The terminals 70 extend from the projecting parts 51 and 52. Specifically, the terminal 71 extends from the projecting part 51 in a direction from one end part of the shaft 49, i.e., the rotary shaft, toward the other end part, and the terminal 72 extends from the projecting part 52 in a direction from one end part of the shaft 49 toward the other end part.

In the embodiment, a gap 65 is formed between the wall part 61 and the terminal 71 in a direction intersecting the shaft 49, i.e., the rotary shaft. The gap 65 is formed between the hole part 63 and the wall part 61. The gap 65 is formed in an annular shape surrounding the hole part 63 as illustrated in FIG. 5. That is, the gap 65 surrounds the hole part 63 from directions (Y-axis direction and Z-axis direction) intersecting the rotary shaft direction (X-axis direction). Also, the gap 65 extends in the rotary shaft direction (longitudinal direction of the shaft 49).

Figure 6:
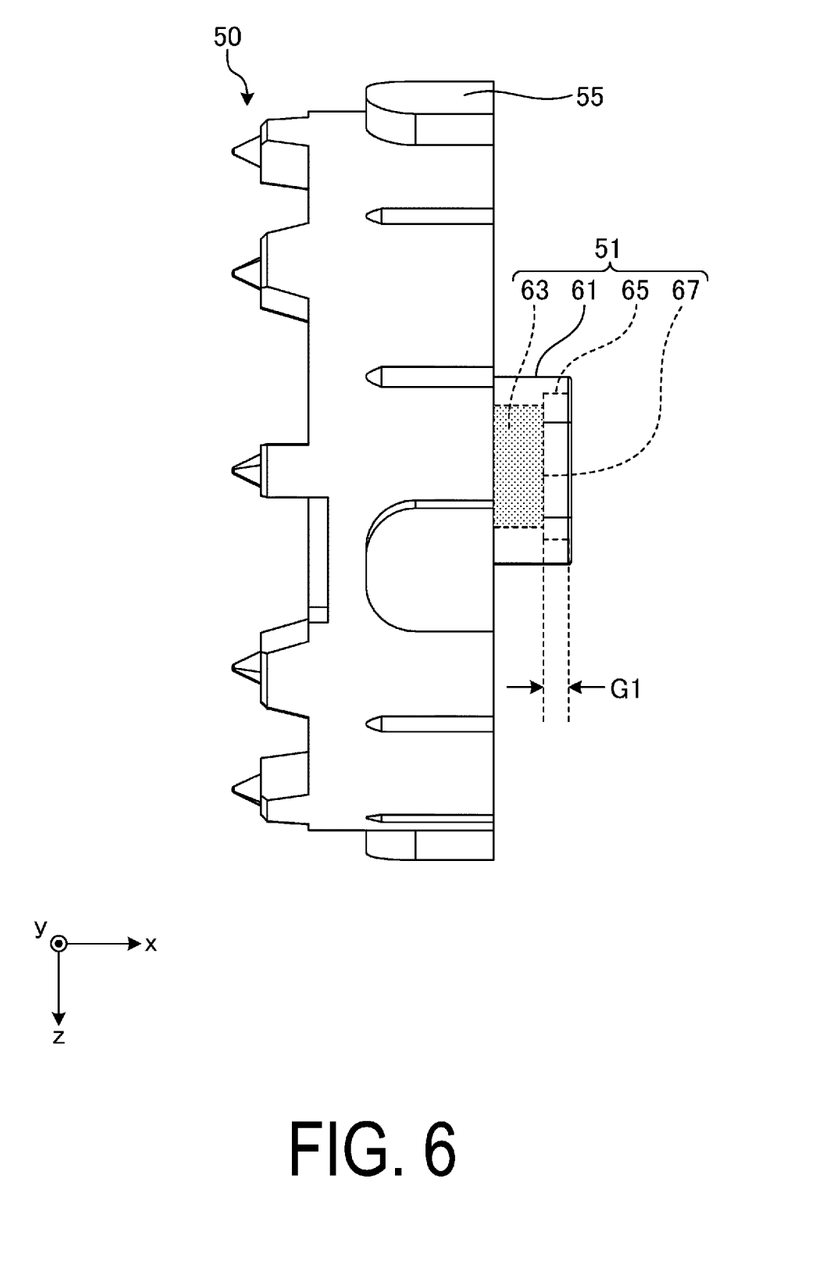
FIG. 6 is a side view illustrating an example of a bracket according to an embodiment.

Also, as illustrated in FIG. 6, an end part 67 of the gap 65 at the negative X-axis direction side is located further to the negative X-axis direction side by a width G1 than an end part of the wall part 61 of the projecting part 51 at the positive X-axis direction side. FIG. 6 is a side view illustrating an example of the bracket according to the embodiment. Note that it is sufficient that the end part 67 be formed further to the negative X-axis direction side of the end part of the wall part 61 at the positive X-axis direction side, and the end part 67 may be formed further to the negative X-axis direction side of the surface 56, for example. Also, a gap 66 is formed in a similar manner to the gap 65.

Figure 7:
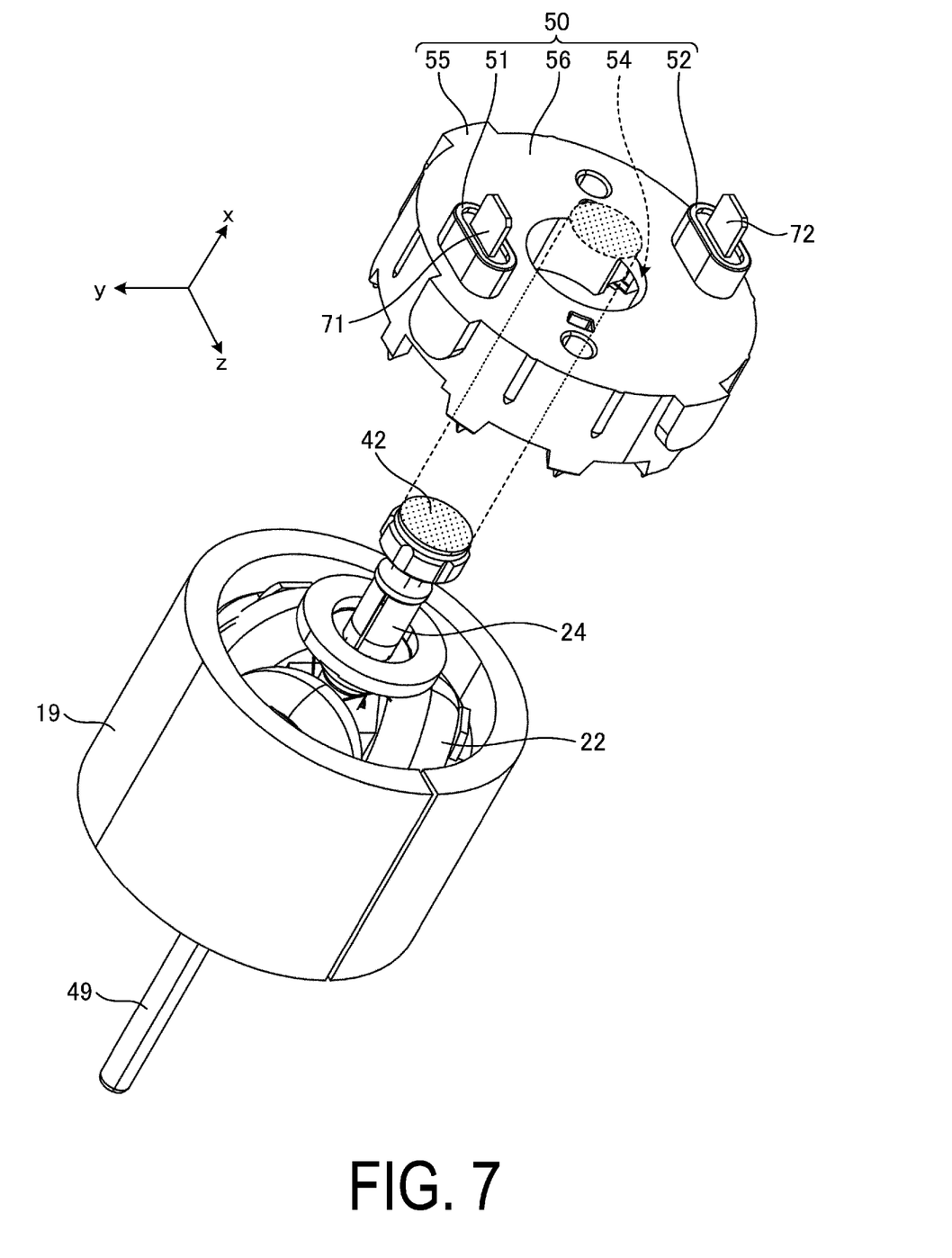
FIG. 7 is an exploded perspective view illustrating an example of how a functional unit and a bracket are joined in an embodiment.

As illustrated in FIG. 7, the armature 20 with the shaft 49 inserted is inserted into the bracket 50. FIG. 7 is an exploded perspective view illustrating an example of how the functional unit and the bracket are joined in the embodiment. As illustrated in FIG. 7, the bearing 42 is inserted into the bracket 50 and projects further to the positive X-axis direction side than the surface 56 of the bracket 50.

Figure 8:
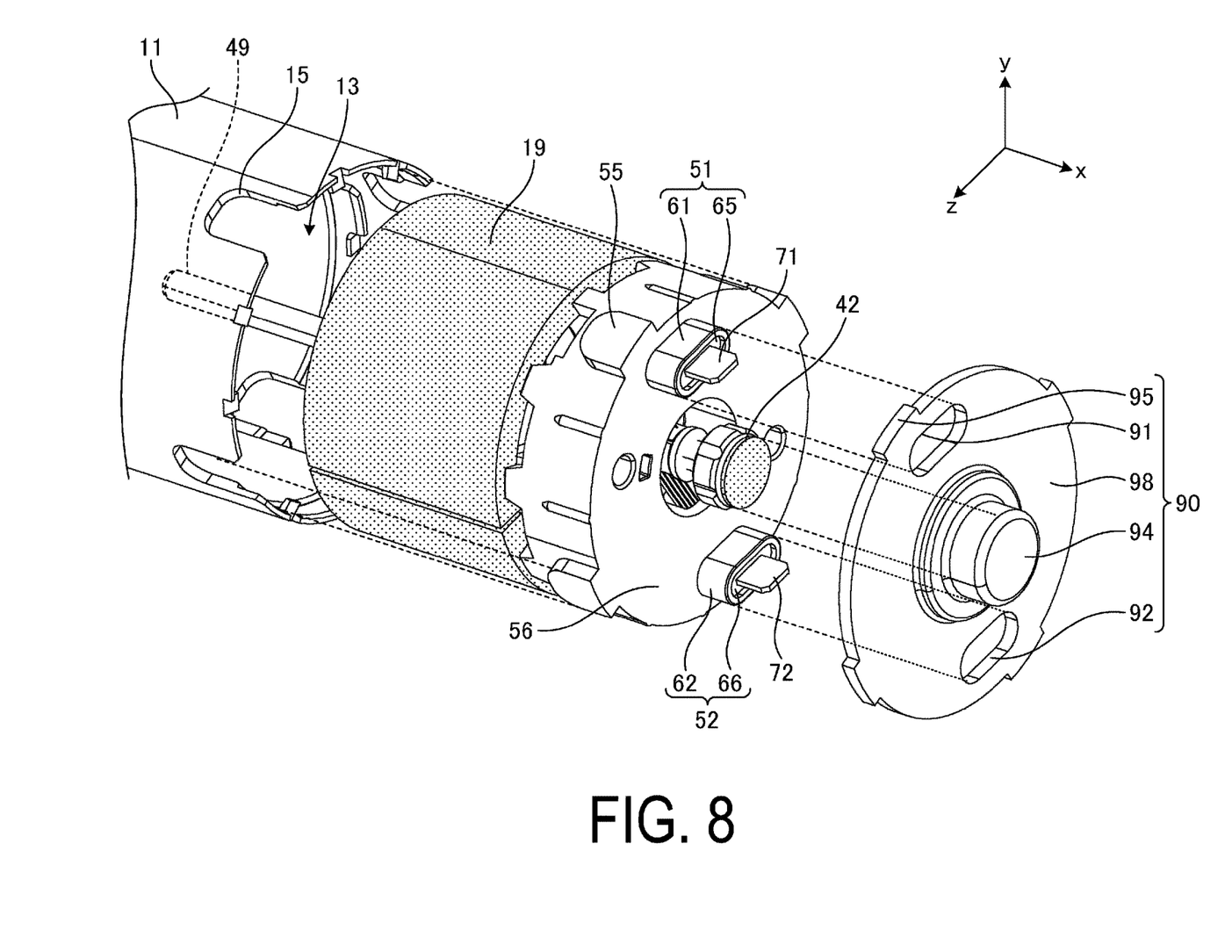
FIG. 8 is an exploded perspective view illustrating an example of how a functional unit and a bracket are accommodated in a frame according to an embodiment.

As illustrated in FIG. 8, the bracket 50 engages with the frame 10 from the positive X-axis direction side. Also, the surface 56 of the bracket 50 at the substrate 80 side (positive X-axis direction side) is covered by the lid 90. FIG. 8 is an exploded perspective view illustrating an example of how the functional unit and the bracket are accommodated in the frame according to the embodiment. As illustrated in FIG. 8, the lid 90 includes two openings 91 and 92, a projecting part 94 projecting in the positive X-axis direction side, and a plurality of engagement parts 95 projecting outward in the radial direction. The plurality of engagement parts 95 engage with the indents 15 of the frame 10. The projecting part 94 projects to the positive X-axis direction side from the surface 98 opposing the substrate 80 in the X-axis direction.

The projecting part 51 of the bracket 50 is inserted into the opening 91 of the lid 90, and the projecting part 52 is inserted into the opening 92. Accordingly, as illustrated in FIG. 2, the projecting parts 60 and the terminals 70 project further to the outside (positive X-axis direction side) than the lid 90 from the openings 91 and 92 of the lid 90.

Also, the bearing 42 is accommodated in the projecting part 94 of the lid 90. As illustrated in FIG. 2, the projecting part 94 of the lid 90 projects further to the positive X-axis direction side by a width W2 than the projecting parts 60 of the bracket 50.

Also, the substrate 80 is fixed to the terminals 70 projecting from the lid 90 of the motor 1 via soldering, for example. In this case, as illustrated in FIG. 2, the substrate 80 is supported by the projecting parts 60 of the bracket 50 and separated from the lid 90 of the motor 1 in the X-axis direction. In other words, the first surface 89 of the substrate 80 and the surface 98 of the lid 90 oppose one another in the X-axis direction across a gap W1.

In such a configuration, vibration of the motor 1 or the like transferring to the substrate 80 is suppressed, and thus the connection between the substrate 80 and the terminals 70 can be made stable.

Furthermore, when soldering the substrate 80 to the terminals 70, the solder S used for the soldering may leak out from the gap between the hole 81 of the substrate 80 and the terminal 71 and the gap between the hole 82 and the terminal 72.

Figure 9:
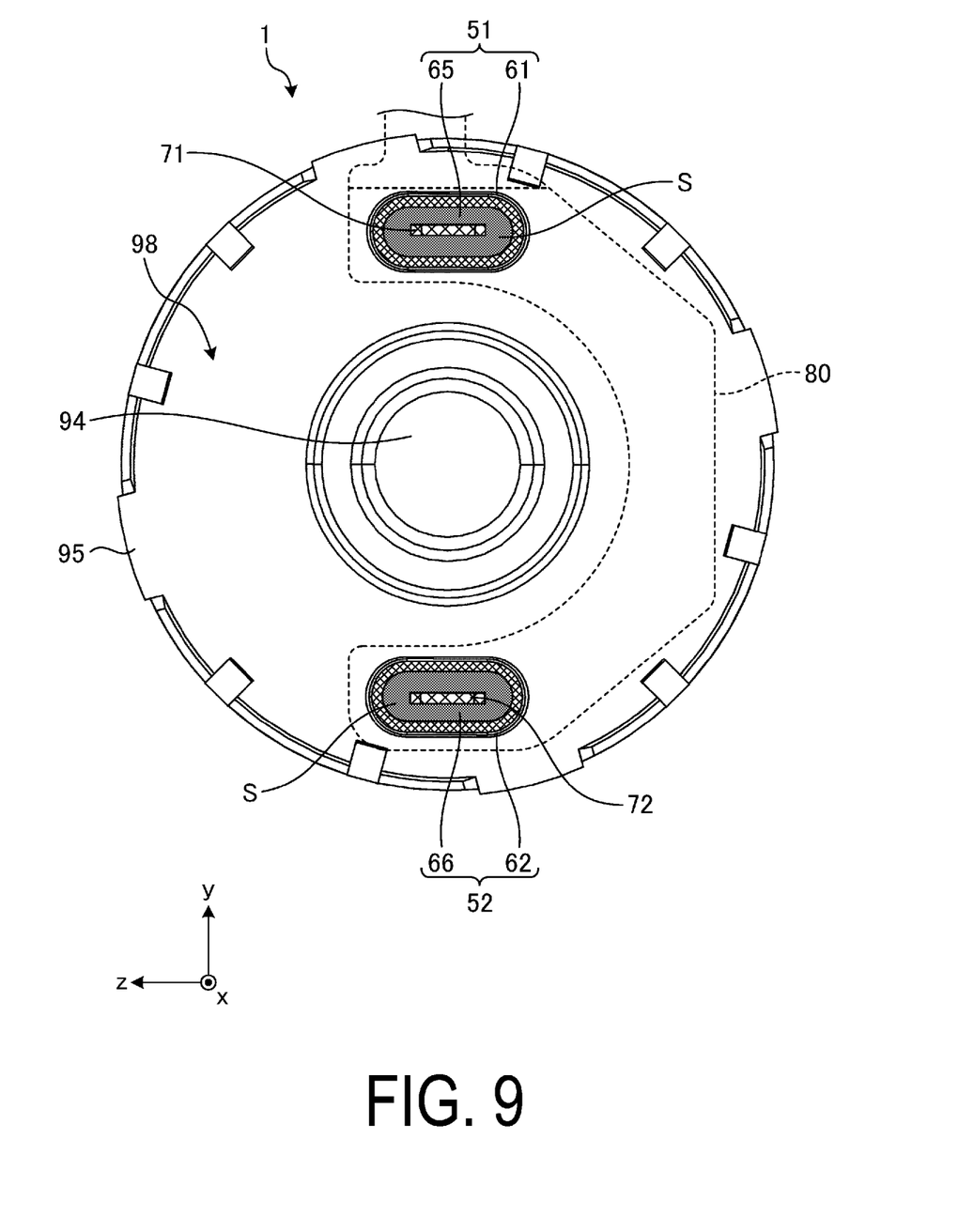
FIG. 9 is a cross-sectional view illustrating an example of a motor connected to a substrate according to an embodiment.

In the embodiment, as illustrated in FIG. 9, the leaked solder S is accommodated in the gap 65 formed between the terminal 71 and the wall part 61 of the projecting part 51 of the bracket 50 and the gap 66. That is, the gaps 65 and 66 are solder reservoirs. FIG. 9 is a cross-sectional view illustrating an example of a motor connected to a substrate according to the embodiment. FIG. 9 illustrates a cross section taken along line C-C in FIG. 2. Also, the solder S is an example of a member for electrically connecting the substrate and the terminals.

In this case, the leaked solder S is accommodated in the gaps 65 and 66, improving the soldering workability. Furthermore, the substrate 80 is separated from the lid 90 of the motor 1, also improving the soldering workability.

As described above, the motor 1 according to the embodiment includes the lid 90 including the openings 91 and 92, the bracket 50 provided with the projecting parts 51 and 52, and the terminals 71 and 72 extending from the projecting parts 51 and 52. The bracket 50 is covered by the lid 90, and the projecting parts 51 and 52 project from the openings 91 and 92 of the lid 90. According to such a configuration, vibration of the motor 1 or the like transferring to the substrate 80 is suppressed, and thus the connection between the terminals and the substrate can be made stable.

Modifications

The configurations of the embodiment have been described thus far, but the embodiment is not limited to these configurations. For example, a configuration according to the embodiment may be applied to other motors such as a brushless motor. Also, the substrate 80 is not limited to being a flexible substrate and may be a printed circuit board or the like.

Additionally, as long as the wall part 61 continuously covers the hole part 63, the wall part 61 may have a tubular shape. The same applies to the wall part 62. In this case, the cross-sectional area of the wall parts 61 and 62 is not limited to being an elliptical shape such as the shape illustrated in FIG. 5 and may be a substantially circular or substantially rectangular shape, for example.

The projecting parts 60 have a substantially elliptical cross-sectional shape, for example, but are not limited to this shape. The cross-sectional shape may be substantially circular, rectangular, or the like.

As illustrated in FIG. 1, the motor 1 has a substantially cylindrical cross section, for example, but is not limited to this shape. For example, the motor 1 may be a so-called square motor with a substantially quadrangular cross section. Also, in the configuration described above, the tubular part 11 includes the bottom part 12. However, in another example, the tubular part may not include the bottom part 12, and the negative X-axis direction side of the tubular part may be covered by another member such as the lid 90. Also, the projecting part 14 may be formed at a member other than the bottom part 12.

Also, at the projecting parts 51 and 52 of the bracket 50, the gaps 65 and 66 are formed in both the radial direction (Y-axis direction) of the hole parts 63 and 64 and a direction (Z-axis direction) orthogonal to the radial direction. However, for the embodiment, no such limitation is intended. For example, the gaps may be only formed in the Y-axis direction or only formed in the Z-axis direction.

The rotor or the stator described in the embodiment and the modifications of the present invention may be installed at an actuator, an electronic device, or the like. Specifically, the rotor or the stator described in the embodiments and the modifications of the present invention may be accommodated in a frame, a housing, a body, or the like of an actuator or electronic device and may be used as a drive element of the actuator or the electronic device.

The embodiment and the modifications of the present invention have been described, but the present invention is not limited to the embodiment and the modifications but can be variously modified without departing from the spirit of the present invention. Various modifications within a scope not departing from the gist are included in the technical scope of the present invention, and this is obvious to a person having skill in the art from the description of the claims.

REFERENCE SIGNS LIST

1 Motor, 10 Frame, 11 Tubular part, 12 Bottom part, 13 Opening, 14 Projecting part, 15 Recessed part (indent), 19 Magnet, 20 Armature, 21 Rotor core, 22 Coil, 24 Commutator, 31, 32 Brush, 41, 42 Bearing, 49 Shaft, 50 Bracket, 51, 52, 60 Projecting part, 54 Opening, 55 Engagement part, 56 Surface, 61, 62 Wall part, 63, 64 Hole part, 65, 66 Gap, 70, 71, 72 Terminal, 80 Substrate, 81, 82 Hole, 88 Second surface, 89 First surface, 90 Lid, 91, 92 Opening, 94 Projecting part, 95 Engagement part, 98 Surface

The invention claimed is:

1. A connection structure of a motor and a substrate comprising:
   a motor, and
   a substrate, wherein the motor includes
      a lid including an opening;
      a bracket including a projecting part; and
      a terminal extending from the projecting part, wherein
         a part of the bracket is covered by the lid, and
         the projecting part projects from the opening of the lid,
         the substrate includes a surface opposing the lid,
         the lid includes a surface opposing the substrate,
         the substrate is supported by the projecting part,
         the surface of the substrate is separated from the surface of the lid, and
         the substrate is connected to the terminal.

2. The connection structure of a motor and a substrate according to claim 1, wherein the motor includes
a frame; and
a rotary shaft including one end part projecting from the frame and another end part supported by the lid, wherein
the lid covers a surface of the bracket at a side of the another end part of the rotary shaft,
the terminal extends from the projecting part in a direction from the one end part of the rotary shaft toward the another end part, and
the projecting part includes a hole part and a wall part surrounding the terminal, the terminal being inserted into the hole part.

3. The connection structure of a motor and a substrate according to claim 2, wherein
a gap is formed between the wall part and the terminal in a direction intersecting the rotary shaft, and
the gap extends in a rotary shaft direction.

4. The connection structure of a motor and a substrate according to claim 1, wherein the motor includes
a commutator; and
a brush that comes into contact with the commutator.

5. The connection structure of a motor and a substrate according to claim 1, wherein
the projecting part includes a hole part and a wall part surrounding the terminal, the terminal being inserted into the hole part,
the lid covers the surface of the bracket at a side of the substrate,
the terminal is inserted into the hole part in a direction from the bracket toward the substrate,
a gap is formed between the wall part and the terminal in a direction intersecting a rotary shaft, and
a member electrically connecting the substrate and the terminal is located in the gap.

* * * * *